April 22, 1941.   W. R. WALTON, JR   2,239,635
PROCESS FOR PRODUCTION OF ENDLESS BANDS
Filed Jan. 29, 1938   3 Sheets-Sheet 1
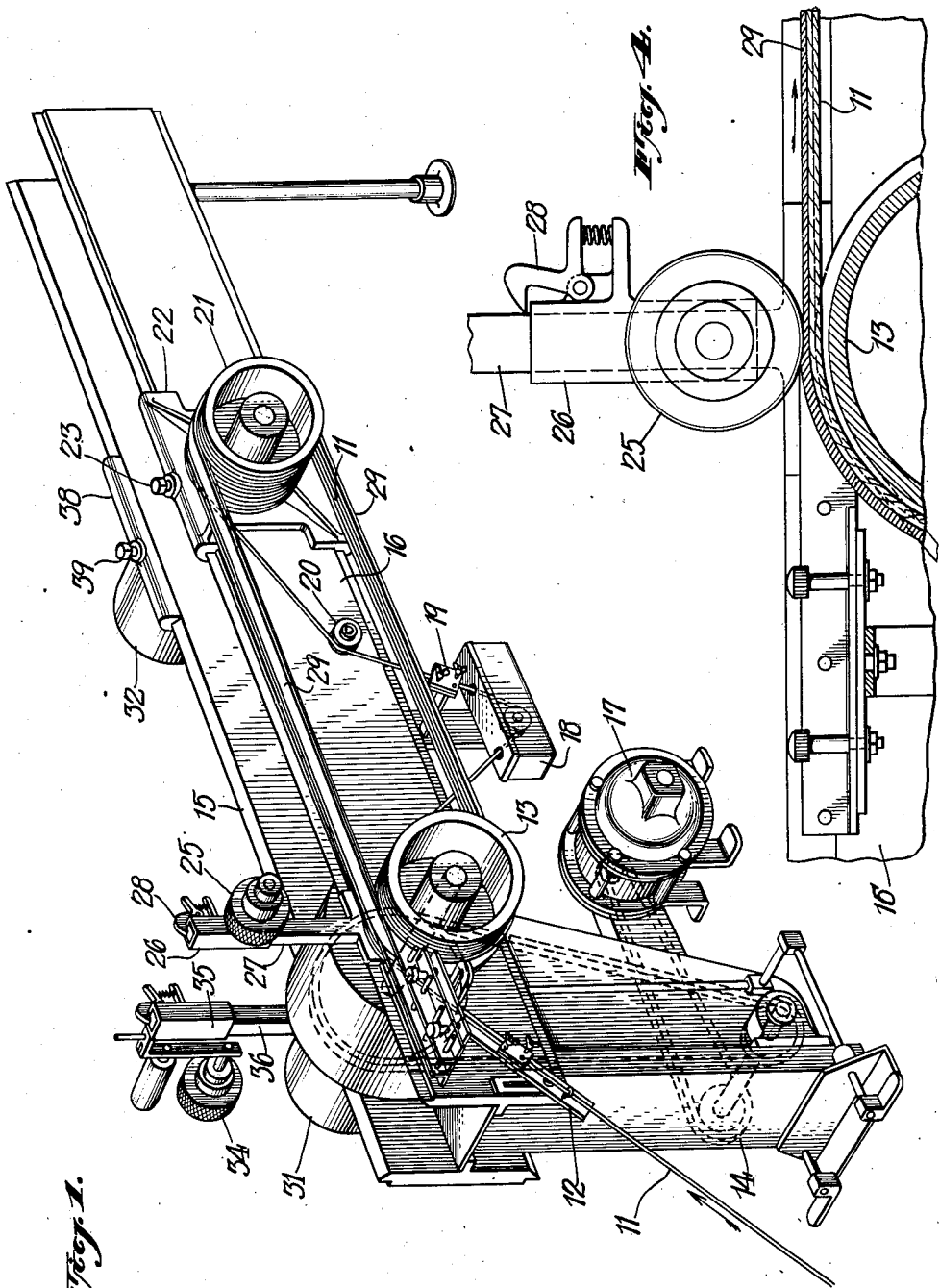
INVENTOR.
WILLIAM R. WALTON, Jr.
BY Benj. T. Rauker
ATTORNEY.

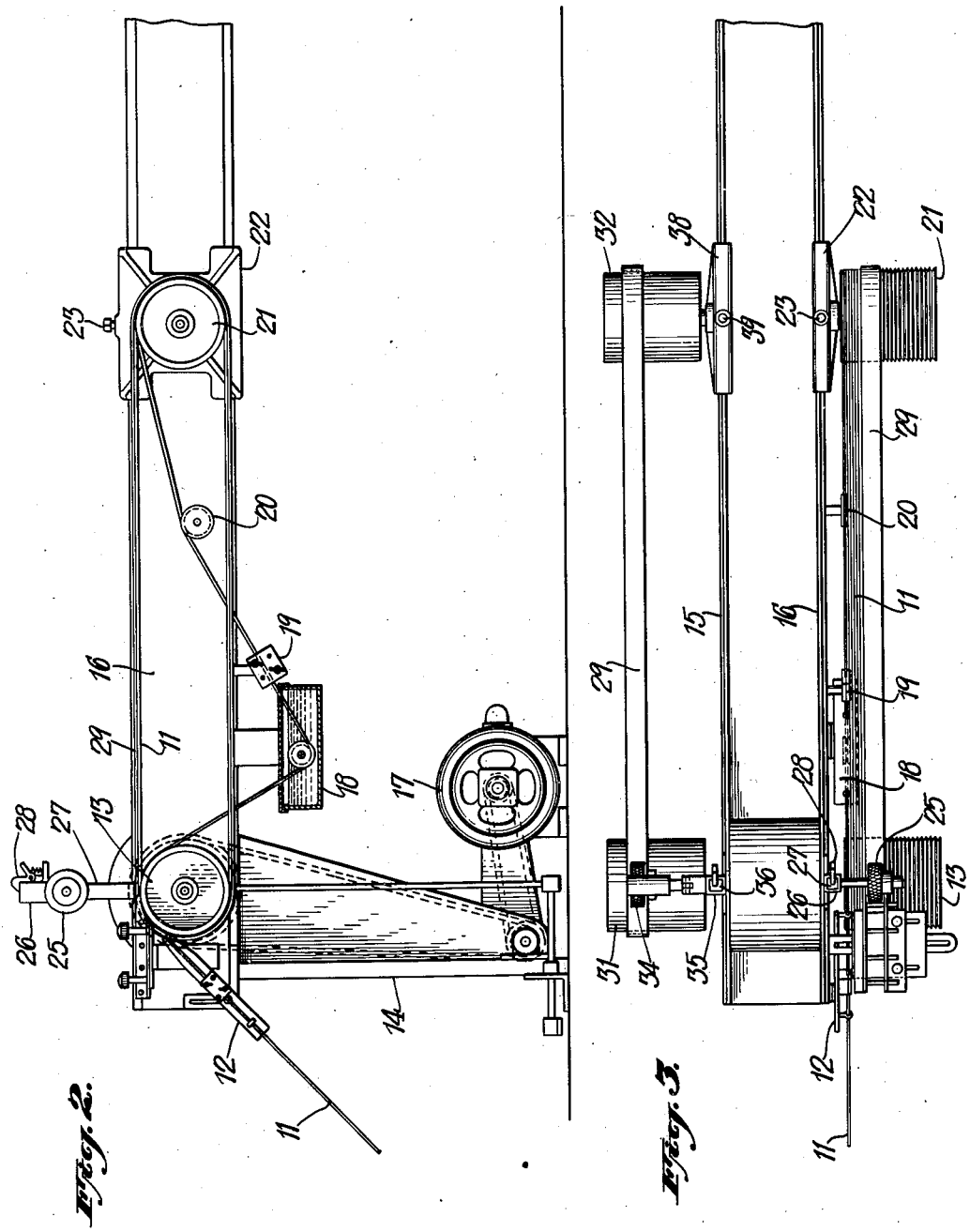

April 22, 1941. W. R. WALTON, JR 2,239,635
PROCESS FOR PRODUCTION OF ENDLESS BANDS
Filed Jan. 29, 1938 3 Sheets-Sheet 3
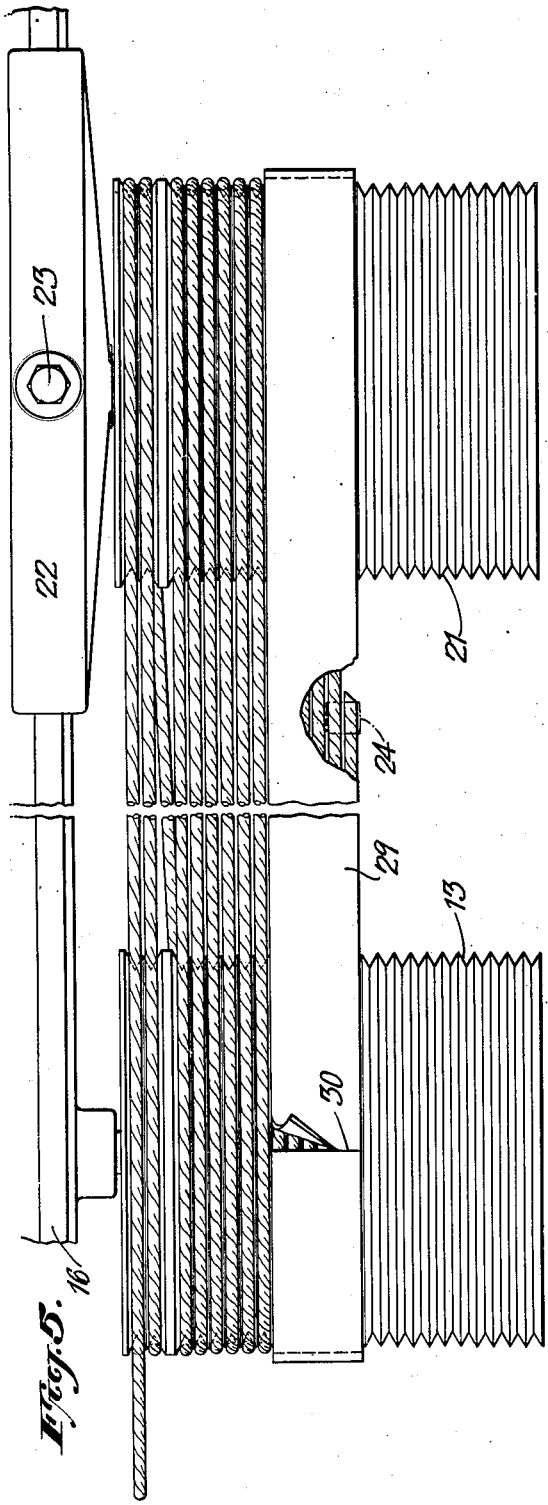
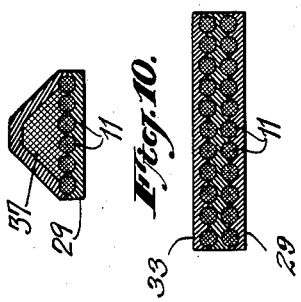
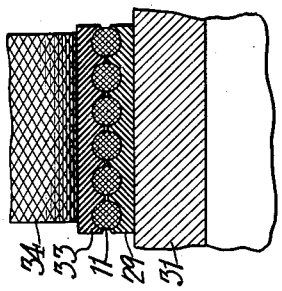
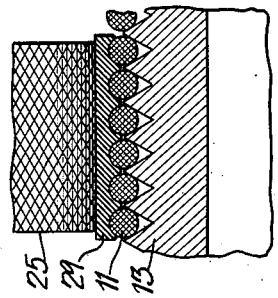
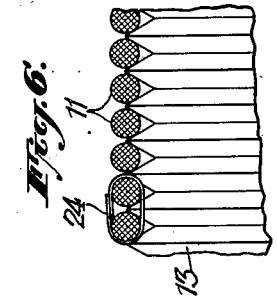
INVENTOR.
WILLIAM R. WALTON, Jr.
BY Benj. T. Rauber
ATTORNEY.

Patented Apr. 22, 1941

2,239,635

UNITED STATES PATENT OFFICE 2,239,635

PROCESS FOR PRODUCTION OF ENDLESS BANDS

William R. Walton, Jr., Toronto, Ontario, Canada, assignor to Dunlop Tire and Rubber Goods Co. Limited, Toronto, Ontario, Canada, a corporation of Canada Application January 29, 1938, Serial No. 187,703

4 Claims. (Cl. 154—4)

My invention relates to a process for the production of endless bands of helically wound cords, and more particularly to the production of such endless bands for use in power transmission, such belting being of an inverted truncated V cross section, a flat transmission belt, or one of other form.

Transmission belts of the above type preferably have one or more layers of continuous cord or strand embedded in a medial position in a mass of rubber or similar composition. These cords are stretched to their limit before being embedded in the belting so that the belting itself is substantially stretchless.

My present invention provides a method for forming cords into endless bands of any desired diameter and width and with which the bands may be made with the cords arranged with equal tension and in definite contiguous relationship and whereby numbers of layers of cords for such bands may be formed easily and rapidly.

The various features of the invention are illustrated by way of example in the accompanying drawings, in which—

Fig. 1 is a perspective view of a machine for forming endless bands embodying a preferred form of the invention.

Fig. 2 is a side elevation, and Fig. 3 is a plan of the machine shown in Fig. 1.

Fig. 4 is a partial side view, on a larger scale than that of Figs. 1 and 2, showing the manner in which one side of a layer of contiguous-lying cords is covered with a layer of rubber or similar plastic.

Fig. 5 is a plan view on a scale similar to that of Fig. 4, showing the manner of applying a plastic strip to the cords.

Figs. 6, 7 and 8 are sectional views showing different stages of forming the contiguous-lying cords and the formation of the endless band therefrom.

Fig. 9 is a transverse section of a V-shaped belt formed according to my invention, and Fig. 10 is a similar transverse section of a flat belt.

In my invention a cord, which may be formed of textile or other fibers preferably impregnated with latex or latex rubber, is trained about and guided on a pair of pulleys, or similar rotating surfaces, rotatably mounted on spaced parallel axes. The cord is passed first over one pulley and thence through a half-turn and to the other pulley in the manner of a belt, and then back to the first pulley so as to form a complete loop. The front end of the cord may then be secured sidewise to a succeeding length of cord so that as the pulleys rotate, additional lengths are drawn onto the pulleys to form successive, contiguous or slightly spaced loops, thus gradually forming a band of such cord. In passing about the pulleys or rotating surfaces each successive loop of cord is held in fixed unvarying position by means of any suitable guides. Such guides may comprise positioning fingers co-operating with a cylindrical surface or may be a pulley provided with closed, circular or endless grooves co-operating with a plane pulley or over which the cords themselves may be passed. The cords are guided about the pulleys so as to lie in a closely spaced or contiguous arrangement and form a flat band. In the preferred form of the invention the cord is laid over a pair of pulleys provided with a series of closely spaced V-shaped grooves of such width and spacing as to hold the cords in approximate sidewise contact or but very slightly spaced. After a number of loops have been thus formed on the pulleys, the cord is severed at such a point as to form a band of the required width, the severed ends being then attached to their next adjacent loops. When the assembled cords are to be formed into a rubber covered belt or band, a rubber strip is laid on and pressed into contact with the assembled cords before severing.

The finished cord assembly may then be removed, placed on smooth pulleys but with the rubber strip surface innermost in contact with the pulley surface, and a layer of rubber either of flat or truncated V-section is applied to the opposite side of the cord layer to form the completed belt or band.

Referring more particularly to the accompanying drawings, a strip of cord 11 is drawn from any suitable source through a tensioning device 12 and thence over a grooved driving pulley 13 rotatably mounted on a frame comprising a pulley pedestal 14 and a pair of substantially horizontal rails 15 and 16. The grooved pulley 13 may be driven from any suitable source as, for example, by an electric motor 17 through a belt and other transmission mechanism not shown. From the driving pulley 13 the cord passes downwardly into a rubber solution bath 18, thence upwardly through a squeegee 19 over a guide pulley or roller 20 and onto a second grooved pulley 21 mounted in a bracket 22 slidably carried on the rail 16. The bracket 22 may be clamped on the rail 16 by a screw 23 to provide any suitable distance between the pulleys 13 and 21 and thus form a belt or band of selected diameter. After passing over the grooved pulley 21, the end of the cord is again brought back to the pulley 13 and laid in a groove therein next adjacent to the groove into which it was originally laid.

As shown more particularly in Figs. 5, 6 and 7, each of the pulleys 13 and 21 has a series of V-shaped grooves, the grooves having a pitch but slightly, if any, greater than the diameter of the cords. There is, however, a wider separation between the first two grooves of each roll and the remaining grooves, these first two grooves serving mainly as guiding or starting grooves. After a length of cord has been trained about the pair of pulleys, the leading end of the cord is secured to the next adjacent length by means of a strip of rubber gum as shown at 24 in Figs. 5 and 6. The continued rotation of the pulley 13 thereupon serves to drive the pulley 21 and to wrap succeeding turns of cord in closely spaced or contiguous position on the pulleys. The grooves in the pulleys 13 and 21 are parallel and concentric. The cords pass, therefore, directly about the pulleys, crossing over from the groove of one pulley to the groove of the other.

When a sufficient number of turns of cord have been wrapped onto the pulleys, a strip of rubber composition or similar plastic material is rolled onto a number of cords corresponding to the width of a belt or band to be formed. For this purpose a roller 25 preferably having a milled surface is mounted in a bracket 26 slidably supported on an upright 27 above the driving pulley 13. During the wrapping of the cord length the bracket 26 is held in its uppermost position by means of a spring catch 28 which engages the top of the upright or standard 27.

When the cords are to be covered with a strip of rubber shown at 29 in Figs. 1, 4, 5 and 6, the catch 28 is released to permit the roller 25 to descend to the position shown in Fig. 4 and serve to press the rubber strip downwardly into the spaces between the successive layers of cord 11 as indicated in Fig. 7. As soon as a length equal to the circumference of the band has been thus pressed in, the end of the rubber strip is severed and the two ends placed in abutment as at 30 in Fig. 5, whereupon the successive rolling of the band will unite the rubber into a continuous structure. When a belt width is thus completed, the cord is separated between the completed belt and the next adjacent turn of cord and the severed end secured to the latter by a second strip of rubber gum similar to the strip 24, and a successive band or width of cord layers is then formed. The completed band 29 may be removed in any suitable way, or may run itself from the pulleys during a successive rotation thereof.

It will be apparent that by adjusting the distance apart of the pulleys 13 and 21 the peripheral length or circumference of the band may be made to any desired length or dimension. Also it will be noted that bands of any desired width or number of turns of cord may be made up to the full number of grooves of the rollers. The above apparatus, therefore, provides a wide variety of band or belt dimensions.

After the cord layers have thus been formed and removed from the pulleys 13 and 21, the band thus formed is turned inside out and placed on pulleys 31 and 32 on the opposite side of the frame, the layer of rubber strip 29 being then next to the pulley surface as indicated in Fig. 8. A second layer 33 of rubber is then laid onto the cord assembly and pressed thereinto by means of a milled roller 34 similar to the roller 25 and similarly supported in a bracket 35 on an upright 36 above the pulley 31. The pulley 31 may be co-axially mounted on the same shaft as the pulley 13 and driven by the same means. In this way a flat belt may be made as shown in Fig. 8. If a V-shaped belt is to be formed, a layer of rubber material 37 of truncated inverted V-section is placed on the completed cord layer, as shown in Fig. 9, and then pressed into position thereon by a suitable roller in the same manner as is done with the roller 34, or by any other suitable means. The truncated V-section may be formed purely of rubber or with bias square woven cloth in any suitable or known manner. In some cases two layers of cords are desired. In this case two bands of suitable diameters or perimeters are assembled, one on the other, with an intermediate layer or strip of rubber and then pressed into a unitary assembly as indicated in Fig. 10, or any number of superposed layers may thus be formed to form a belt or band of greater strength than could be obtained by a single layer. It will be noted that for this purpose the driven pulley 32 is slidably supported on the rail 15 by means of a slidable bracket 38, and held in adjustable position thereon by means of a setscrew 39.

What I claim is:

1. A method of forming an endless band of continuous cords which comprises leading an end of said cord successively about a pair of spaced rotatable surfaces to form a complete loop, fastening the leading end of the cord contiguous to a succeeding length thereof, rotating said surfaces to circulate said loop thereabout and draw successive lengths of said cord into contiguous loops to form a flat band, holding said cords in fixed positions on said surfaces during their passage thereover, covering said band with a layer of rubber, and pressing said rubber into interengagement with the loops of said band while holding said cords in position on said surfaces.

2. A method of forming an endless band of contiguous cords embedded in rubber which comprises leading an end of a cord through a rubber solution and thence successively about a pair of spaced rotatable surfaces to form a complete loop, securing the leading end of the cord to a succeeding length thereof, rotating said surfaces to circulate said loop thereabout and draw successive lengths of said cord into contiguous loops to form a flat band, holding said cords in fixed positions on said surfaces during their passage thereover, and pressing a cover of rubber into inter-engagement with the cord of said band while holding said cords in fixed position on said surfaces.

3. A method of forming an endless band of continuous cord which comprises leading said cord successively about a pair of spaced, rotatable, circumferentially grooved surfaces to form closely spaced loops in successive grooves of said surfaces to form a flat band, covering the loops of said band with a layer of compounded unvulcanized rubber composition, pressing said layer of rubber composition into the spaces between said loops as said loops pass over one of said grooved surfaces to embed said loops in said layer.

4. A method of forming an endless band of continuous cord which comprises leading said cord under constant tension to and about a pair of spaced, rotatable, circumferentially grooved surfaces to form closely spaced loops in successive grooves of said surfaces to form a flat band, covering the loops of said band with a layer of compounded unvulcanized rubber composition, pressing said layer of rubber composition into the spaces between said loops as said loops pass over one of said grooved surfaces to embed said loops in said layer.

WILLIAM R. WALTON, Jr.